United States Patent
Narimatu (10) Patent No.: US 9,881,241 B2
(45) Date of Patent: Jan. 30, 2018

(54) IMAGE FORMING APPARATUS, IMAGE FORMING SYSTEM AND IMAGE FORMING METHOD

(71) Applicant: Konica Minolta, Inc., Chiyoda-ku, Tokyo (JP)

(72) Inventor: Eiichi Narimatu, Tokyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/291,735

(22) Filed: Oct. 12, 2016

(65) Prior Publication Data
US 2017/0109617 A1    Apr. 20, 2017

(30) Foreign Application Priority Data

Oct. 14, 2015  (JP) ................................. 2015-202566

(51) Int. Cl.
*G06K 15/02*    (2006.01)
*G03G 15/16*    (2006.01)
(Continued)

(52) U.S. Cl.
CPC ......... *G06K 15/1897* (2013.01); *G03G 15/16* (2013.01); *G03G 15/55* (2013.01);
(Continued)

(58) Field of Classification Search
USPC ....................................................... 258/1.14
See application file for complete search history.

(56) References Cited

U.S. PATENT DOCUMENTS

2006/0159480 A1*  7/2006  Mima ..................... B41J 3/60
                                                      399/82
2006/0256389 A1   11/2006  Sakata et al.
(Continued)

FOREIGN PATENT DOCUMENTS

JP    2006-091179 A1    4/2006
JP    2006-221609 A     8/2006
(Continued)

OTHER PUBLICATIONS

Office Action (Notification of Reasons for Refusal) dated Dec. 12, 2017 by the Japanese Patent Office in corresponding Japanese Patent Application No. 2015-202566 and English Translation of the Office Action, (12 pages).

*Primary Examiner* — Ngon Nguyen
(74) *Attorney, Agent, or Firm* — Buchanan Ingersoll & Rooney PC (57) ABSTRACT

An image forming apparatus includes: an image forming unit that prints an image on a transfer medium based on image data; a conveyance unit that conveys the transfer medium; a duplex printing mechanism that inverts and conveys the transfer medium on one surface of which an image is formed, and conveys the transfer medium to a conveyance direction upstream side of the image forming unit; and a control unit that controls the image forming unit and the conveyance unit, the control unit has a function of printing a first additional image outside an image forming area of the transfer medium by the image forming unit, and when printing the first additional image, the control unit is capable of control of inhibiting printing of the first additional image on one or both of a leading transfer medium and a final transfer medium in a bundle of piled up transfer media.

13 Claims, 9 Drawing Sheets

(51) Int. Cl.
  *G06K 15/16* (2006.01)
  *G06K 15/00* (2006.01)
  *G03G 15/00* (2006.01)

(52) U.S. Cl.
  CPC ......... *G03G 15/6582* (2013.01); *G06K 15/16* (2013.01); *G06K 15/4025* (2013.01); *G03G 15/5062* (2013.01); *G03G 2215/00814* (2013.01); *G03G 2215/00902* (2013.01); *G03G 2215/048* (2013.01)

(56) References Cited

U.S. PATENT DOCUMENTS

2008/0019727 A1* 1/2008 Honma ................. B41J 3/60
                                                          399/82
2010/0328722 A1  12/2010  Yasunaga
2014/0022609 A1  1/2014  Tanigawa et al.

FOREIGN PATENT DOCUMENTS

| JP | 2006-315231 A | 11/2006 |
| JP | 2011-011367 A1 | 1/2011 |
| JP | 2013-220659 A | 10/2013 |
| JP | 2014-022919 A1 | 2/2014 |

\* cited by examiner

IMAGE FORMING APPARATUS, IMAGE FORMING SYSTEM AND IMAGE FORMING METHOD

The present U.S. patent application claims a priority under the Paris Convention of Japanese patent application No. 2015-202566 filed on Oct. 14, 2015, the entirety of which is incorporated herein by references.

BACKGROUND OF THE INVENTION

Field of the Invention

The present invention relates to an image forming apparatus, an image forming system and an image forming method capable of printing a front-and-back adjustment mark outside an image forming area of a transfer medium by an image forming unit and adjusting the front and back in image formation by an image read result of the front-and-back adjustment mark.

Description of the Related Art

In an image forming apparatus, an image is formed on a paper sheet based on image data, and a cutting mark such as a register mark is sometimes printed as an additional image in a margin part outside an image area of the paper sheet as a mark when cutting the paper sheet (for example, see Japanese Patent Laid-Open No. 2011-11367).

In addition, in the image forming apparatus, an image can be formed on both surfaces of the paper sheet by providing a duplex printing mechanism. The duplex printing mechanism is normally a mechanism that inverts and conveys a paper sheet body on one surface of which an image is formed and conveys the paper sheet body to a conveyance direction upstream side of the image forming unit. Now, when performing duplex printing, the paper sheet sometimes moves through a conveyance path different from the one in the case of normal simplex printing only, and positional displacement of the image is sometimes generated between a front surface and a back surface. Also, between the front surface and the back surface, the paper sheet is expanded and contracted due to presence/absence of temperature rise and humidification or the like, and a size of the image sometimes changes. Therefore, an image forming apparatus capable of front-and-back adjustment of adjusting positions of the image on the front and the back and magnifications on the front and the back has been proposed.

In the front-and-back adjustment, a mark for image position adjustment (for example, a cross patch) is printed on the front and back surfaces of a paper sheet, it is image-detected in an inline detection unit, and image formation adjustment is performed.

For example, in Japanese Patent Laid-Open No. 2014-22919, a device that matches the front and back by using a chart exclusive for front-and-back positioning is proposed.

In addition, in Japanese Patent Laid-Open No. 2006-91179, an image adjustment pattern is formed outside an image area and it is read to adjust the front and back.

Now, in an image forming apparatus, there is a demand to perform real time adjustment of adjusting the front and back during a job. However, in the apparatus disclosed in Japanese Patent Laid-Open No. 2014-22919, since an exclusive chart is utilized, there is a problem that waste paper is generated. In addition, when cutting a paper sheet on which an image is printed, an additional image different from a normal image is sometimes printed in a margin or the like such as printing a cutting mark as a mark for cutting. When this function is used, there is a merit that the front and back are not shifted from a leading page to a final page, and there is no shift during cutting. However, when such an additional image is printed in coexistence with a mark for image position adjustment as indicated in Japanese Patent Laid-Open No. 2006-91179, it becomes difficult to distinguish both, and there is a risk of causing a cutting error, for example.

In the meantime, in Japanese Patent Laid-Open No. 2011-11367, a cutting mark is printed, and it is conceivable to use it as a front-and-back adjustment mark. However, the cutting mark is made near an input image according to a cutting position, and there is a risk that measurement accuracy during the front-and-back adjustment lowers.

SUMMARY OF THE INVENTION

The claimed invention is implemented with the above-described situation as a background, and an object is to provide an image forming apparatus, an image forming system and an image forming method that allow printing of a first additional image and make discrimination or the like easy even when there is a second additional image such as a cutting mark when printing the first additional image.

To achieve at least one of the abovementioned objects, according to an aspect, an image forming apparatus reflecting one aspect of the present invention includes:

an image forming unit that prints an image on a transfer medium based on image data;

a conveyance unit that conveys the transfer medium; and a control unit that controls the image forming unit and the conveyance unit, the control unit has a function of printing a first additional image outside an image forming area of the transfer medium by the image forming unit, and, when printing the first additional image, the control unit is capable of control of inhibiting printing of the first additional image on one or both of a leading transfer medium and a final transfer medium in a bundle of piled up transfer media.

In the image forming apparatus according to the abovementioned aspect, it is preferable that the image forming apparatus includes:

a duplex printing mechanism that is included in the conveyance unit, inverts and conveys the transfer medium on one surface of which an image is formed, and conveys the transfer medium to a conveyance direction upstream side of the image forming unit, and the control unit has a front-and-back adjustment function of printing a front-and-back adjustment mark outside the image forming area of the transfer medium by the image forming unit as the first additional image, acquiring an image read result of the front-and-back adjustment mark, and performing front-and-back adjustment in the image formation using the image read result upon duplex printing, and, when printing the front-and-back adjustment mark on the transfer medium by the front-and-back adjustment function, the control unit is capable of control of inhibiting printing of the front-and-back adjustment mark on one or both of a leading transfer medium and a final transfer medium in a bundle of piled up transfer media In the image forming apparatus according to the abovementioned aspect, it is preferable that the image forming apparatus includes a read unit that detects the front-and-back adjustment mark, and the control unit acquires an image read result by the read unit.

In the image forming apparatus according to the abovementioned aspect, it is preferable that the outside of the image forming area is a cutting margin.

In the image forming apparatus according to the abovementioned aspect, it is preferable that the control unit has a function of printing a second additional image outside the image forming area.

In the image forming apparatus according to the abovementioned aspect, it is preferable that the control unit has a function of forming a cutting mark as the second additional image on the transfer medium by the image forming unit.

In the image forming apparatus according to the abovementioned aspect, it is preferable that the control unit does not perform control of inhibiting printing of the first additional image when not printing the second additional image.

In the image forming apparatus according to the abovementioned aspect, it is preferable that the bundle is a bundle of the transfer media output as a copy.

In the image forming apparatus according to the abovementioned aspect, it is preferable that the bundle is a bundle of the transfer media loaded on a paper discharge tray.

In the image forming apparatus according to the abovementioned aspect, it is preferable that the bundle is a bundle of the transfer media when loaded on a paper discharge tray within a maximum number of sheets.

In the image forming apparatus according to the abovementioned aspect, it is preferable that the control unit is capable of control of switching a paper discharge destination, and performs control to inhibit printing of the first additional image on the transfer medium which is one or both of a leading transfer medium and a final transfer medium, to the bundle outputted to the paper discharge tray of a switching destination when the paper discharge destination is switched.

To achieve at least one of the abovementioned objects, according to an aspect, an image forming system reflecting one aspect of the present invention includes:

an image forming unit that prints an image on a transfer medium based on a job;

a conveyance unit that conveys the transfer medium; and a control unit that controls the image forming unit and the conveyance unit, the control unit has a function of printing a first additional image outside an image forming area of the transfer medium by the image forming unit, and, when printing the first additional image, the control unit is capable of control of inhibiting printing of the first additional image on one or both of a leading transfer medium and a final transfer medium in a bundle of piled up transfer media.

To achieve at least one of the abovementioned objects, according to an aspect, an image forming method reflecting one aspect of the present invention includes:

an image forming step of executing printing of an image to a transfer medium based on a job; and an additional image printing step of printing a first additional image outside an image forming area of the transfer medium, and, in the additional image printing step, a job of printing the first additional image to the transfer medium is inhibited from printing the first additional image to the transfer medium which is one or both of a leading medium and a final medium in a bundle of piled up transfer media.

To achieve at least one of the abovementioned objects, according to an aspect, an image forming method reflecting one aspect of the present invention includes:

an image forming step of making printing of an image to a transfer medium be executed based on a job; and an additional image printing step of making a first additional image be printed outside an image forming area of the transfer medium, and, in the additional image printing step, a job of printing the first additional image to the transfer medium is inhibited from printing the first additional image to the transfer medium which is one or both of a leading medium and a final medium in a bundle of piled up transfer media.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DETAILED DESCRIPTION OF THE PREFERRED EMBODIMENTS

Hereinafter, an embodiment of the present invention will be described with reference to the drawings. However, the scope of the invention is not limited to the illustrated examples.

One embodiment of the present invention will be described below based on the attached drawings.

Figure 1:
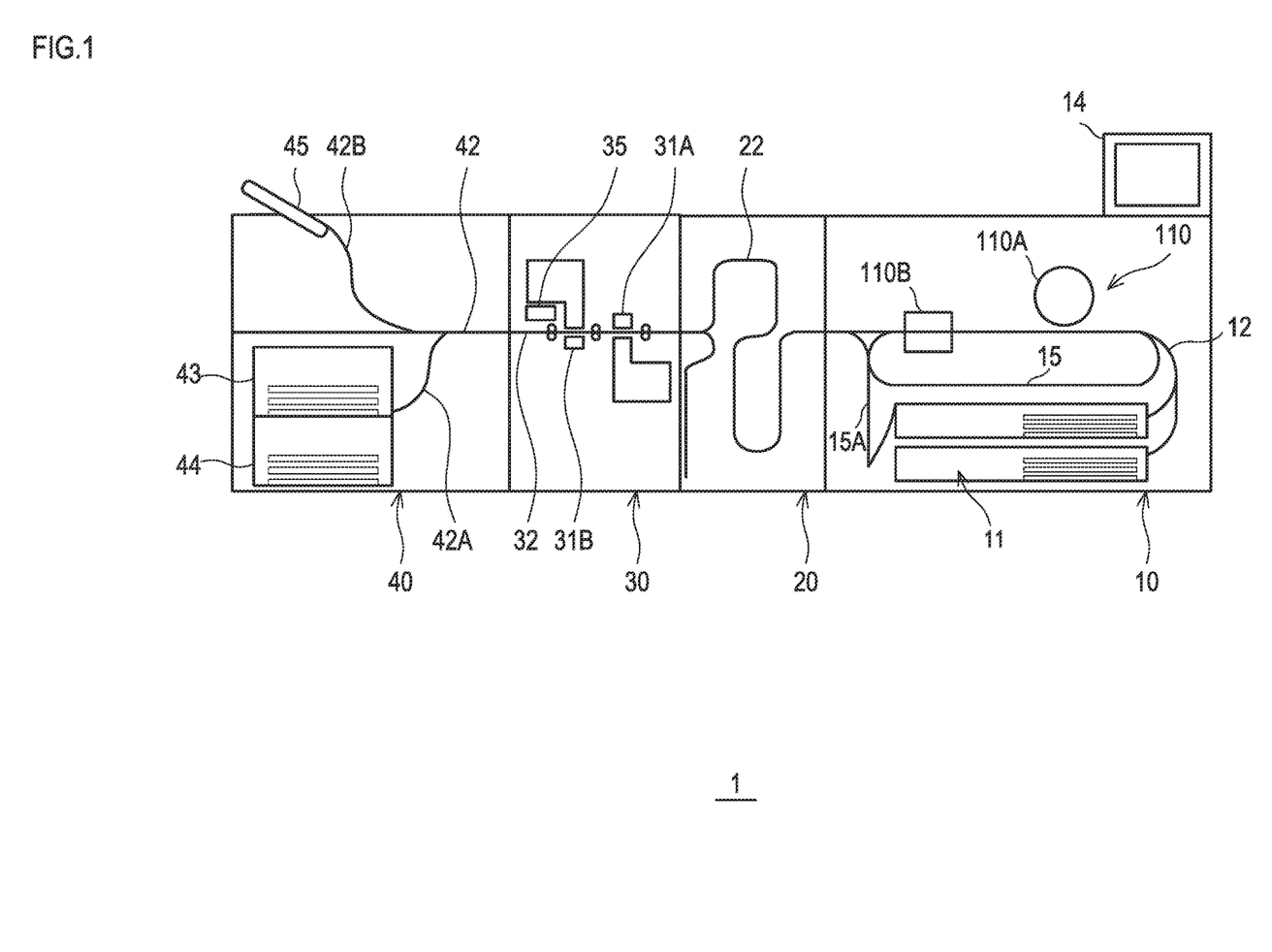
FIG. 1 is a diagram illustrating an outline of an image forming system in one embodiment of the present invention.

An image forming system 1 illustrated in FIG. 1 includes an image forming apparatus body 10, a relay device 20, a reader 30, and a paper discharge device 40. In this embodiment, the image forming apparatus body 10 corresponds to the image forming apparatus of the present invention. Note that, in the image forming system of the present embodiment, these devices are essential, however, as the present invention, the configuration is not limited particularly, and can be the one not including the relay device 20, or can be the one provided with the reader inside the image forming apparatus body. In addition, the image forming apparatus of the claimed invention can be formed of a group of these devices.

For the image forming apparatus body 10, an operation panel 14 is installed at a part where platen glass is not positioned, on a body upper side. The operation panel 14 is configured of a touch panel type LCD, and operation and information display by an operator is possible. The operation panel 14 serves as both an operation unit and as a display unit. Note that it is also possible to configure the operation unit with a mouse and a tablet and configure the operation unit separately from the display unit. In addition, the operation panel 14 can be movable.

On a body lower side of the image forming apparatus body 10, a plurality of paper feed trays 11 (two stages in the figure) are arranged, and paper sheets can be housed in the respective paper feed trays 11. Inside the image forming apparatus body 10, a conveyance route 12 that conveys the paper sheet fed from one of the paper feed trays 11 is arranged. The paper sheet in this embodiment corresponds to the transfer medium of the present invention. Note that the transfer medium is not limited to paper.

In the middle of the conveyance route 12, an image forming unit 110 is provided. The image forming unit 110 includes a photoreceptor 110A, and a charger, an LD (laser diode), a developer, a transfer unit and the like arranged around the photoreceptor 110A and not shown in the figure, and a fixing unit 110B is arranged in the conveyance route 12 on a downstream side of the photoreceptor 110A further.

On the downstream side of the fixing unit 110B, the conveyance route 12 is connected to a conveyance route 22 of the relay device 20.

In addition, in the conveyance route 12, an inversion conveyance route 15 is branched on a downstream side of the image forming unit 110. In the inversion conveyance route 15, an inversion path 15A is branched and provided, and the paper sheet can be inverted and conveyed to the downstream side of the inversion conveyance route 15. A downstream end of the inversion conveyance route 15 joins the conveyance route 12 on the conveyance direction upstream side of the image forming unit 110. The inversion conveyance route 15 and the inversion path 15A described above and a conveyance roller and a drive motor or the like provided in the inversion conveyance route and the inversion path 15A and not shown in the figure configure a duplex printing mechanism.

The conveyance route 12 configures the conveyance unit of the present invention with the conveyance roller and the drive motor or the like not shown in the figure and the duplex printing mechanism or the like.

In the image forming unit 110, by uniformly charging a surface of the photoreceptor 110A by the charger before writing an image and irradiating the photoreceptor 110A whose surface is uniformly charged with a semiconductor laser, an electrostatic latent image is formed on the photoreceptor 110A. The electrostatic latent image formed on the photoreceptor 110A by the semiconductor laser is developed by a toner material of the developer. By the developing processing, a toner image is formed on the photoreceptor 110A. In the transfer unit, the toner image of the photoreceptor 110A is transferred to a paper sheet conveyed from the paper feed trays 11. The paper sheet on which the toner image is transferred is separated from the photoreceptor 110A and conveyed to the fixing unit 110B. A toner member remaining on the photoreceptor 110A is removed by a cleaning unit not shown in the figure.

The fixing unit 110B fixes the toner image transferred to a surface side of the paper sheet as an output image by heating the conveyed paper sheet. The paper sheet to which fixing processing is executed is conveyed to the relay device 20 by the conveyance route 12. Note that the image can be formed on a back surface by conveying the paper sheet to the inversion conveyance route 15 branched on the downstream side of the fixing unit 110B, inverting the front and back of the paper sheet in the inversion path 15A, and then returning to the conveyance route 12 on the upstream side of the image forming unit 110.

The relay device 20 includes the conveyance route 22 that is connected to the conveyance route 12 of the image forming apparatus body 10 and connected to the reader 30 of a subsequent stage, and the paper sheet is relayed and conveyed to the downstream side.

The reader 30 includes a conveyance route 32 connected to the conveyance route 22 of the relay device 20, and the conveyance route 32 includes a surface detection unit 31A that detects the image on the surface of the paper sheet conveyed through the conveyance route 32 and outputs an image read result, and a back surface detection unit 31B that detects the image on the back surface of the paper sheet and outputs an image read result. Image detection results of the surface detection unit 31A and the back surface detection unit 31B are transmitted to a read control unit 35 provided in the reader 30, and notified from the read control unit 35 to the image forming apparatus body 10. The surface detection unit 31A and the back surface detection unit 31B correspond to the read unit of the present invention.

The paper discharge device 40 includes a conveyance route 42 connected to the conveyance route 32 of the reader 30. A branch path 42A is branched from the conveyance route 42, and a first stacker 43 and a second stacker 44 are connected to the branch path 42A. Further, a branch path 42B is branched from the conveyance route 42, and a paper discharge tray 45 is connected to the branch path 42B.

As the embodiment of the image forming system, the conveyance routes 22, 32 and 42 can configure the conveyance unit together with the conveyance roller and a drive unit not shown in the figure.

Note that the first stacker 43 and the second stacker 44 also correspond to the paper discharge tray of the present invention.

Figure 2:
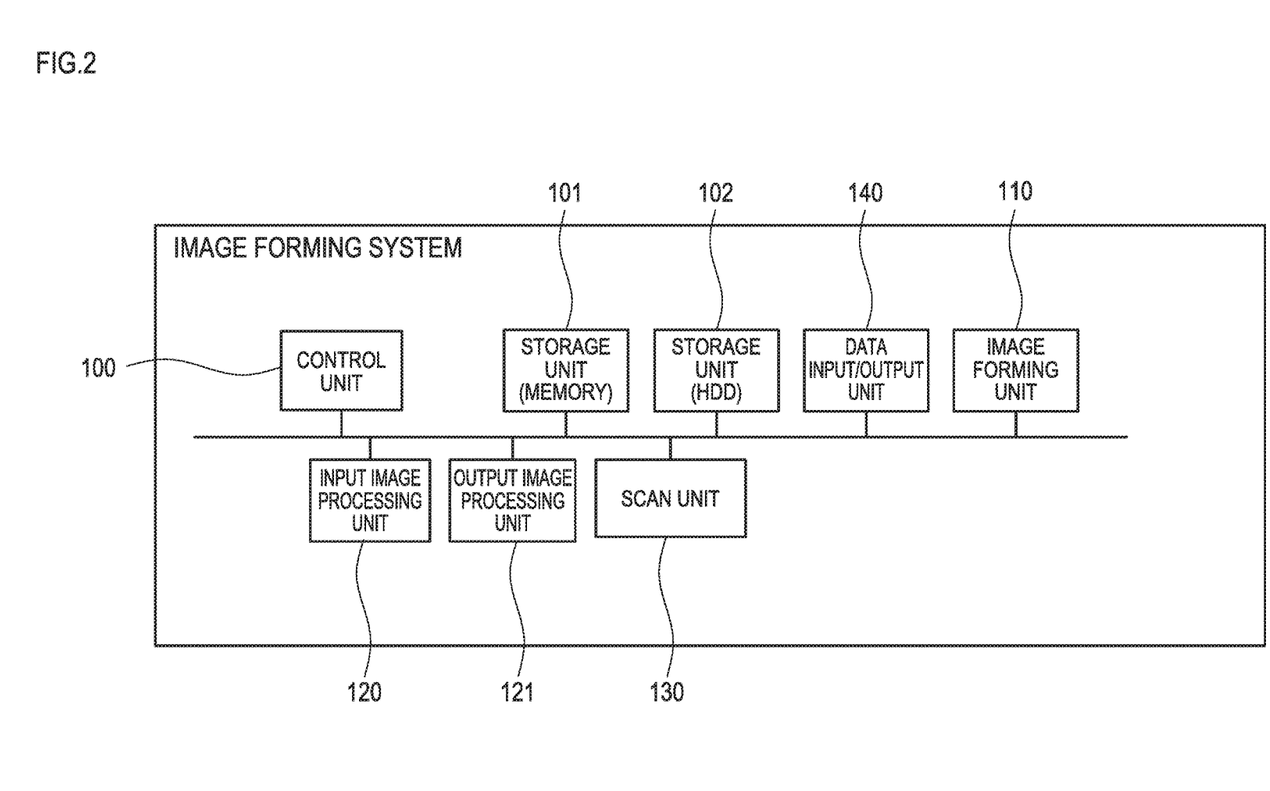
FIG. 2 is a diagram illustrating a control block similarly in the one embodiment.

Next, a control block of the image forming system of the present embodiment will be described based on FIG. 2.

A control unit 100 is configured by a CPU, programs executed in the CPU, a ROM, a RAM and the like, and controls the entire image forming system 1. The programs can be stored in the ROM or the like. The CPU of the control unit 100 reads a system program and various kinds of processing programs stored in the ROM, for example, develops them in the RAM, executes various kinds of processing according to the developed programs, controls operations of the respective units of the image forming system, and acquires an image read result of the reader 30.

For example, the control unit 100 can function, by the operations of the programs, as a front-and-back adjustment mark generation unit that generates a front-and-back adjustment mark as a first additional image, a cutting mark generation unit that generates a cutting mark as a second additional image, a final page determination unit that determines whether a page of printing of a job is a final page, and a scan image analysis unit that analyzes an image detection result read in the reader 30.

In addition, the control unit 100 can be the one that functions as a gradation adjustment mark generation unit for image formation correction.

To the control unit 100, a storage unit (memory) 101 and a storage unit (HDD) 102 are controllably connected. In the storage unit (memory) 101 and the storage unit (HDD) 102, the programs, operation parameters in the image forming system, image data, the image detection result in the reader 30, and the like can be stored. The storage unit (memory) 101 can be provided with a volatile memory and a nonvolatile memory.

An input image processing unit 120 is controllably connected to the control unit 100, image processing is executed to the image data inputted through an original read unit and a network or the like, and the image data is converted to image data for printing and is stored in the storage unit (memory) 101 and the storage unit (HDD) 102 through a data input/output unit 140 to be described later.

An output image processing unit 121 is controllably connected to the control unit 100, converts image data for three colors of R, G and B inputted from the storage unit (memory) 101 and the storage unit (HDD) 102 through the data input/output unit 140 to image data for four colors of Y, M, C and K (yellow, magenta, cyan and black), and outputs it to an exclusive interface of the image forming unit 110 prepared by the control unit 100. Note that images of the cutting mark and the front-and-back adjustment mark are outputted together with the image data for printing as needed. The images of the cutting mark and the front-and-back adjustment mark can be stored in the storage unit (memory) 101 and the storage unit (HDD) 102.

In the case of functioning as the cutting mark generation unit, the control unit 100 reads the image data of the cutting mark from the storage unit (memory) 101 or the storage unit (HDD) 102, and delivers it to the output image processing unit 121.

In the case of functioning as the front-and-back adjustment mark generation unit, the control unit 100 reads the image data of the front-and-back adjustment mark from the storage unit (memory) 101 or the storage unit (HDD) 102, and delivers it to the output image processing unit 121.

The image forming unit 110 forms an image on a paper sheet by an electrophotographic method, based on the image data for colored toner in four colors of Y, M, C and K. Note that, in a schematic diagram in FIG. 1, a single color image forming unit is illustrated for convenience.

The image forming unit 110 includes a colored image forming unit that forms the image using the colored toner in four colors of yellow, magenta, cyan and black.

The image forming unit 110 includes the photoreceptor 110A, and an exposure unit, a charging unit, the cleaning unit and the transfer unit or the like not shown in the figure.

The exposure unit scans and exposes the surface of the photoreceptor 110A by a laser beam, based on the image data sent from the output image processing unit 121. By the scanning exposure of the laser beam, a latent image is formed on the photoreceptor 110A charged by the charging unit, that is, the image is written. The latent image formed on the photoreceptor 110A is visualized by the toner of each color component attached by a corresponding development unit, and the toner image of each color component is formed on each photoreceptor 110A.

The toner image formed and supported on the photoreceptor 110A is transferred to the paper sheet conveyed through the conveyance route 12 through the transfer unit. After transfer, on the paper sheet, the toner image is thermally fixed in the fixing unit 110B.

The data input/output unit 140 is a device that inputs and outputs data, and inputs and outputs the data to/from the storage unit (memory) 101 and the storage unit (HDD) 102.

A scan unit 130 is configured by the surface detection unit 31A, the back surface detection unit 31B and the read control unit 35 provided in the reader 30, and in the scan unit 130, image results of the front and back of the paper sheet are detected, and detection results are notified to the control unit 100.

In the control unit 100, in the case of functioning as the scan image analysis unit, the image read result of the reader 30 can be fed back to the image forming apparatus body 10 to correct the image formation based on the image detection result, and the front-and-back adjustment mark can be read to perform the front-and-back adjustment in the image formation. For the front-and-back adjustment, positions of the images on the front and back are corrected and magnifications on the front and back are adjusted or the like.

In addition, in the control unit 100, in the case of functioning as the final page determination unit, whether or not the page to be printed is the final page is determined depending on the number of pages of the job and face-up or face-down contents.

Figure 3:
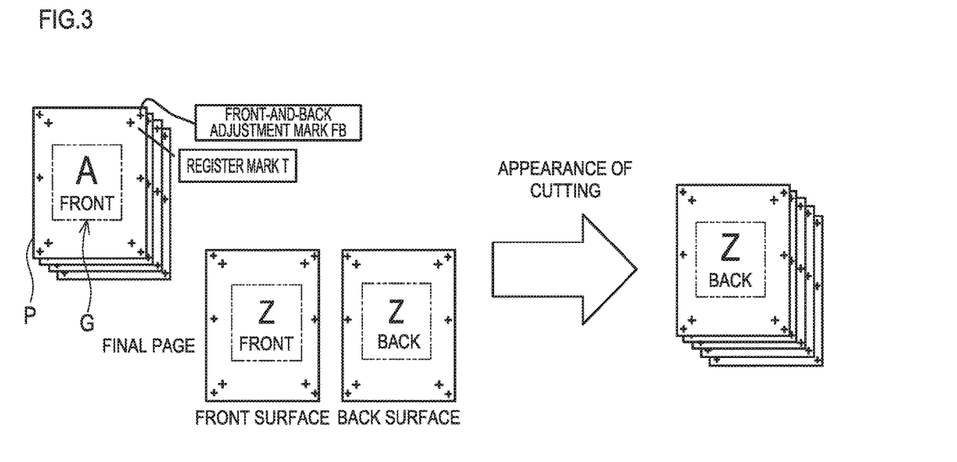
FIG. 3 is a diagram explaining a state that a cutting mark and a front-and-back adjustment mark are printed on a paper sheet.

Next, a case of forming a register mark T as the cutting mark and a front-and-back adjustment mark FB as the front-and-back adjustment mark on a paper sheet will be described based on FIG. 3. Note that the cutting mark corresponds to the second additional image of the present invention, and the front-and-back adjustment mark corresponds to the first additional image of the present invention. Examples of the other additional images are marks of a stamp, numbering, page numbers, dates and the like.

The register mark T is formed at four parts at four corners of a margin outside an image forming area G, for example, on a paper sheet P according to cutting positions. The image forming area is a normal printing area excluding a margin part. The front-and-back adjustment mark FB is formed at four parts at four corners of a cutting margin on the outside more than the register mark T. The front-and-back adjustment mark FB and the register mark T are both formed of a cross patch. In duplex printing, at the respective four corners of the front surface and the back surface, the register mark T and the front-and-back adjustment mark FB are formed respectively. When the paper sheet is discharged and loaded face down, the back surface side of the final page becomes a top surface from a view of cutting.

Figure 4:
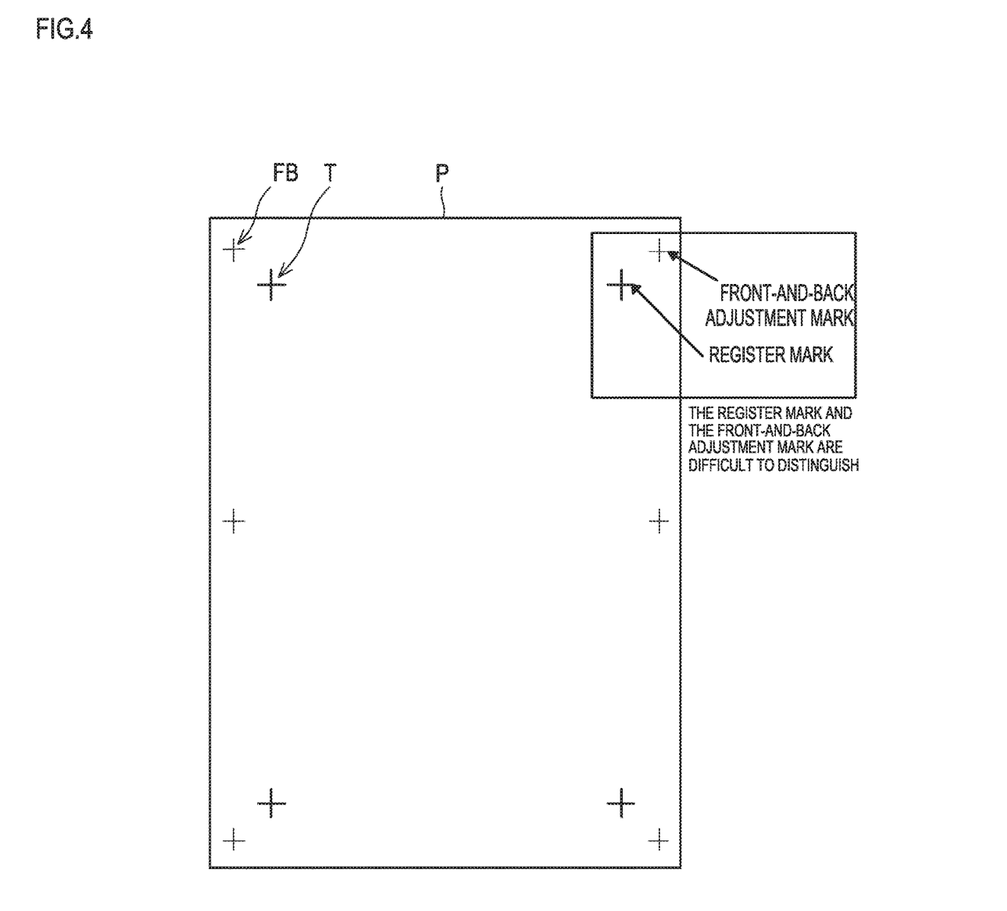
FIG. 4 is a diagram enlarging and explaining a state that a cutting mark and a front-and-back adjustment mark are printed on a paper sheet.

An enlarged view of the paper sheet P is illustrated in FIG. 4. At the four corners of the paper sheet, the register mark and the front-and-back adjustment mark are close and difficult to distinguish. When cutting, for example, is performed with these as marks, there is a possibility of causing a cutting error.

Figure 5:
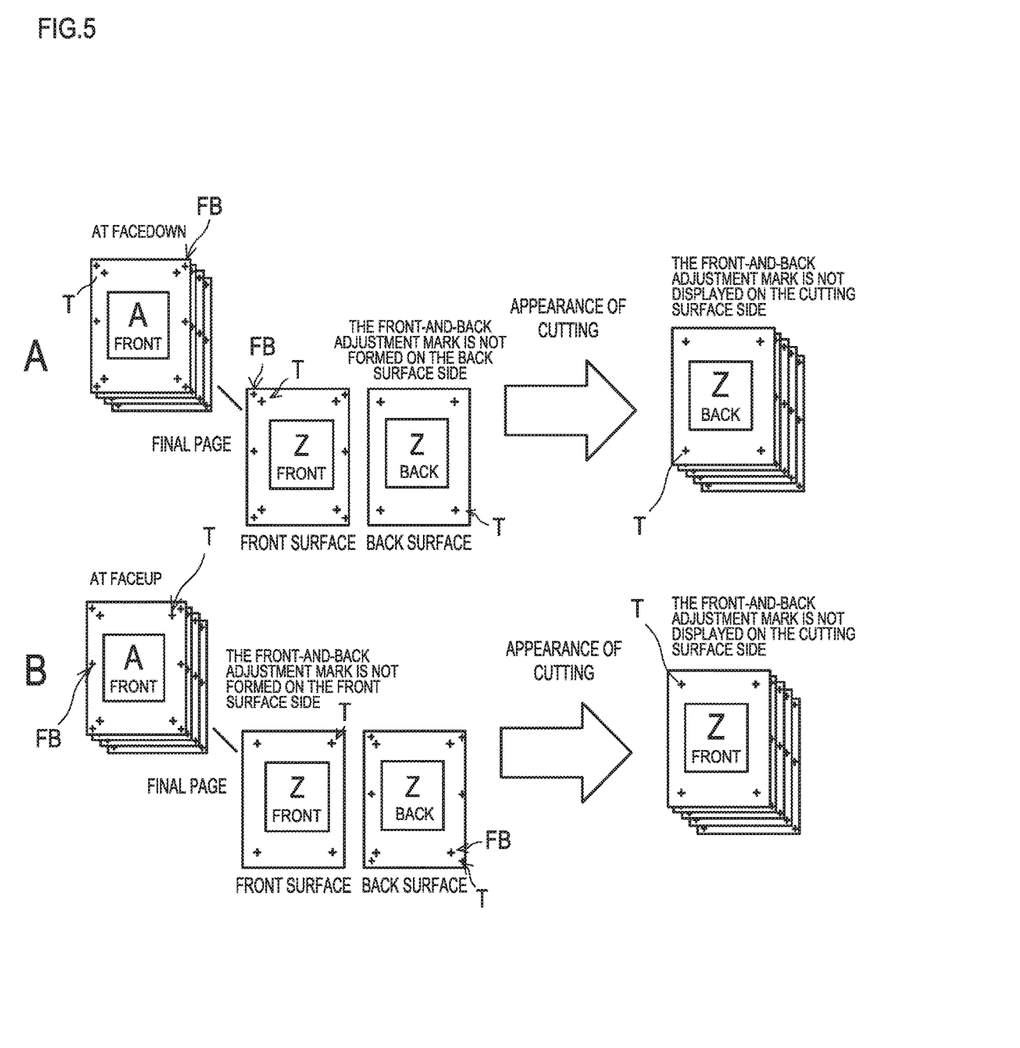
FIG. 5 is a diagram illustrating a state of controlling printing of a front-and-back adjustment mark by the one embodiment of the present invention.

FIG. 5 illustrates an example of a paper sheet for which formation of the front-and-back adjustment mark is controlled by the present embodiment.

A diagram A in FIG. 5 is a diagram illustrating a state when the paper sheets are discharged and turned into a bundle face down in a page order. While the register mark T and the front-and-back adjustment mark FB are formed at the four corners respectively as a general rule on the front and back surfaces of the paper sheet, the control is such that only the register mark T is formed and the front-and-back adjustment mark FB is not formed on the back surface side of the final paper to be the top surface. As a result, on the top surface, the front-and-back adjustment mark FB is not formed.

A diagram B in FIG. 5 is a diagram illustrating a state when the paper sheets are discharged and turned into a bundle face up in the page order. While the register mark T and the front-and-back adjustment mark FB are formed at the four corners respectively as the general rule on the front and back surfaces of the paper sheet, the control is such that only the register mark T is formed and the front-and-back adjustment mark FB is not formed on the front surface side of the final paper to be the top surface. As a result, on the top surface, the front-and-back adjustment mark FB is not formed.

Note that, while an example of discharging the paper sheets in the page order is described above, in the case of discharging the paper sheets in a reverse order of pages, control of not printing the front-and-back adjustment mark on the front surface side of the case of face-down and on the back surface side in the case of face-up on leading paper can be performed. As a result, on the top surface, the front-and-back adjustment mark FB is not formed.

In these examples, since the highest page when loaded becomes a final printing page, useless front-and-back adjustment is eliminated, there is an effect of improving productivity, and operation errors during cutting are eliminated further.

In addition, while the front-and-back adjustment mark is printed as usual on a surface on the opposite side on the top surface in the above description, the control can be performed so as not to print the front-and-back adjustment mark on the surface on the opposite side (the surface on the back side of the page of the top surface) as well.

Further, while the front-and-back adjustment mark FB is not printed on either one of the final paper and the leading paper in the above description, the control of not printing the front-and-back adjustment mark at least on the surface to be the top surface on both of the final paper and the leading paper can be performed. Thus, safety can be improved so as not to cause operation errors even if the bundle is turned over.

Note that, in the above description, in the case of discharging the paper sheets, other than the paper discharge tray 45, the paper sheets can be discharged to the first stacker 43 and the second stacker 44.

In addition, the above-described embodiment is described assuming that the printing of the front-and-back adjustment mark is to be controlled in the image forming system, however, the printing can be controlled similarly in the image forming apparatus. Further, the control unit of the present embodiment can be provided in a management device that is connected to the image forming apparatus and the image forming system through a network and manages them or the like, and the printing of the front-and-back adjustment mark can be controlled by the control unit. It is the same also in the following procedure.

Figure 6:
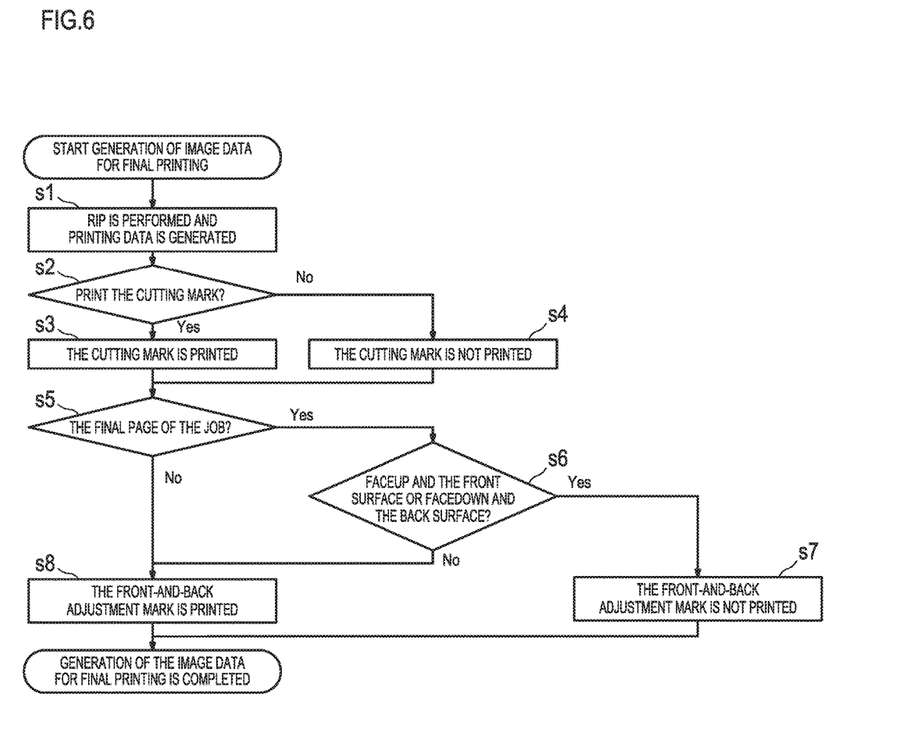
FIG. 6 is a flowchart illustrating a procedure of processing printing of a front-and-back adjustment mark similarly in the one embodiment.

Next, a procedure of processing the printing of the front-and-back adjustment mark by the present embodiment will be described based on a flowchart in FIG. 6. The following procedure is executed by the control of the control unit.

In this example, a surface to print the front-and-back adjustment mark is determined depending on the state of face-up or face-down for the final page of the job in paper discharge in the page order.

Accompanying generation start of image data for final printing, RIP (Raster Image Process) is performed and printing data is generated (step s1). Then, whether to print the cutting mark is determined (step s2). Whether to print the cutting mark is determined by setting beforehand, and for example, when instructing a cutting operation through the operation panel, whether to print the cutting mark can be set. In addition, whether to print the cutting mark can be inquired through the operation panel as the job is started. In the case of printing the cutting mark (step s2, Yes), the cutting mark is printed on the paper sheet (step s3). In the case of not printing the cutting mark (step s2, No), the cutting mark is not printed (step s4).

After step s3 or step s4, whether it is the final page of the job is determined (step s5). In the case that it is not the final page (step s5, No), the front-and-back adjustment mark is printed on the paper sheet (step s8) and the generation of the image data for final printing is completed.

In the case that it is the final page (step s5, Yes), whether it is face-up and the front surface or it is face-down and the back surface is determined (step s6). In the case that these conditions are not satisfied (step s6, No), the front-and-back adjustment mark is printed on the paper sheet (step s8), and the generation of the image data for final printing is completed.

In the case that the conditions in step s6 are satisfied (step s6, Yes), the front-and-back adjustment mark is not printed on the paper sheet (step s7), and the generation of the image data for final printing is completed.

Note that, while whether or not to print the front-and-back adjustment mark on the final page of the job is determined in the above description, whether or not to print the front-and-back adjustment mark on the leading page of the job can also be determined. In such a case, whether to control the printing of the front-and-back adjustment mark on the leading page of the job or to control the printing of the front-and-back adjustment mark on the final page of the job can be set beforehand, and the control can also be performed on both.

Note that, while whether to print the front-and-back adjustment mark is determined by determining whether it is the final page in the above description, by determining whether it is an order of a final sheet, the printing of the front-and-back adjustment mark can be controlled on the leading paper in the case of performing the printing in the reverse order of the pages. It is the same also in the following procedure.

Next, in the case of performing cutting for each copy upon copy break output, since the final page of a copy becomes a leading page, it is required not to print the front-and-back adjustment mark to the final page of the copy. This procedure will be described based on a flowchart in FIG. 7. Note that the following procedure is executed by the control of the control unit.

Figure 7:
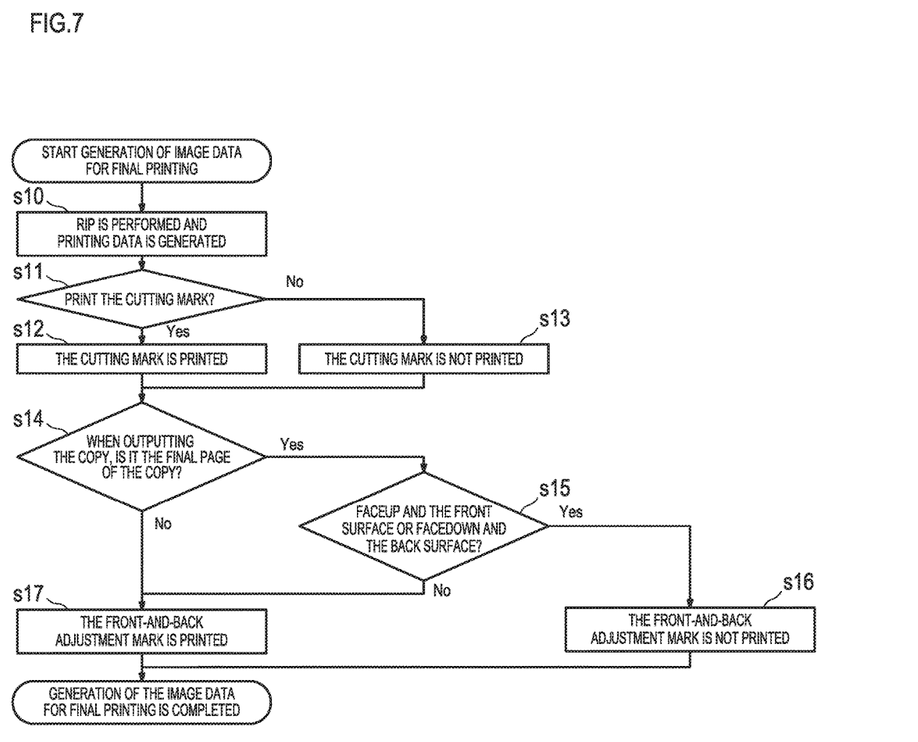
FIG. 7 is a flowchart illustrating a procedure of processing printing of a front-and-back adjustment mark upon copy break output in another embodiment of the present invention.

Accompanying the generation start of the image data for final printing, the RIP (Raster Image Process) is performed and the printing data is generated (step s10). Then, whether to print the cutting mark is determined (step s11). Whether to print the cutting mark is determined by setting beforehand, and for example, when instructing a cutting operation through the operation panel, whether to print the cutting mark can be set. In addition, whether to print the cutting mark can be inquired through the operation panel as the job is started.

In the case of printing the cutting mark (step s11, Yes), the cutting mark is printed on the paper sheet (step s12). In the case of not printing the cutting mark (step s11, No), the cutting mark is not printed (step s13).

After step s12 or step s13, when outputting the copy, whether it is the final page of the copy is determined (step s14). In the case that it is not the final page (step s14, No), the front-and-back adjustment mark is printed on the paper sheet (step s17) and the generation of the image data for final printing is completed.

In the case that it is the final page of the copy (step s14, Yes), whether it is face-up and the front surface or it is face-down and the back surface is determined (step s15). In the case that these conditions are not satisfied (step s15, No), the front-and-back adjustment mark is printed on the paper sheet (step s17), and the generation of the image data for final printing is completed.

In the case that the conditions in step s15 are satisfied (step s15, Yes), the front-and-back adjustment mark is not printed on the paper sheet (step s16), and the generation of the image data for final printing is completed.

Note that, while whether or not to print the front-and-back adjustment mark on the final page of the copy is determined in the above description, whether or not to print the front-and-back adjustment mark on the leading page of the copy can also be determined.

Next, in the case that the job is ended or the stacker becomes full (reaches the maximum number of loading sheets) during discharge to the stacker, there is a possibility to be the leading page for cutting in the next bundle. A procedure of performing the control of not printing the front-and-back adjustment mark on the paper sheet determined to be the leading page for cutting will be described based on FIG. 8. Note that the following procedure is executed by the control of the control unit.

Figure 8:
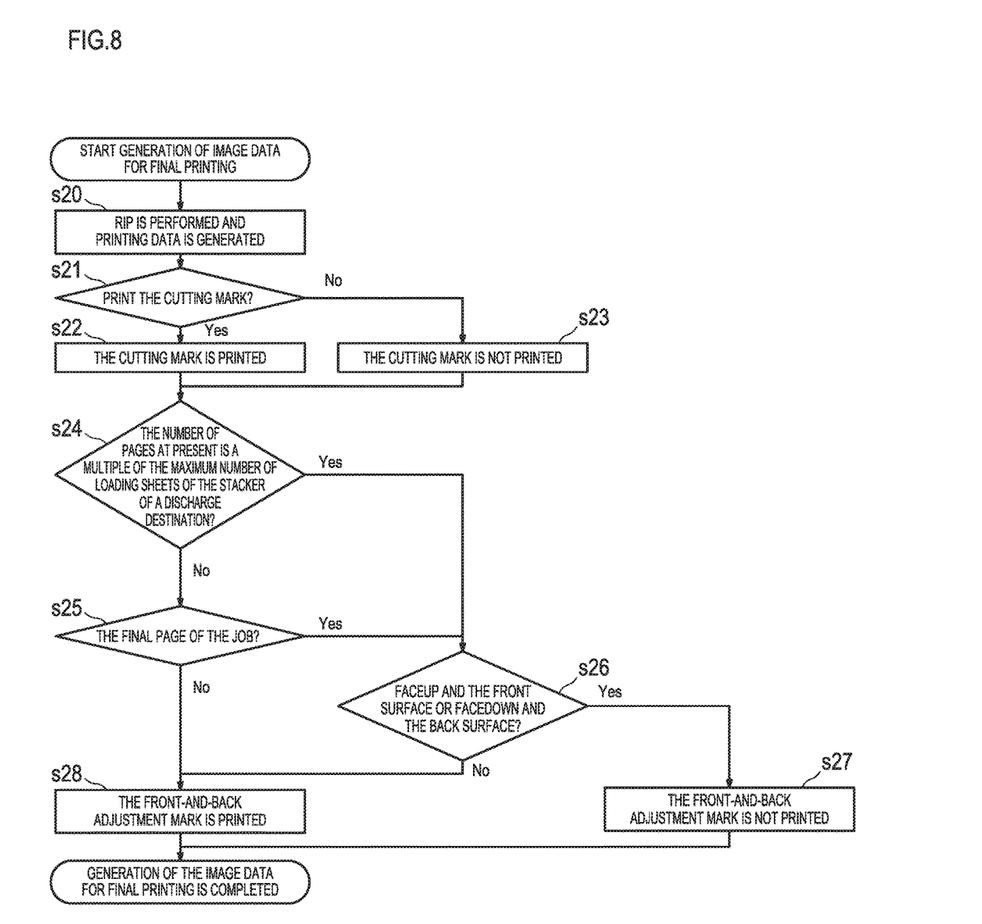
FIG. 8 is a flowchart illustrating a procedure of processing printing of a front-and-back adjustment mark upon discharge to a stacker, in another embodiment of the present invention.

Accompanying the generation start of the image data for final printing, the RIP (Raster Image Process) is performed and the printing data is generated (step s20). Then, whether to print the cutting mark is determined (step s21). Whether to print the cutting mark is determined by setting beforehand, and for example, when instructing a cutting operation through the operation panel, whether to print the cutting mark can be set. In addition, whether to print the cutting mark can be inquired through the operation panel as the job is started.

In the case of printing the cutting mark (step s21, Yes), the cutting mark is printed on the paper sheet (step s22). In the case of not printing the cutting mark (step s21, No), the cutting mark is not printed (step s23).

After step s22 or step s23, whether the number of pages at present is a multiple of the maximum number of loading sheets of the stacker of a discharge destination is determined (step s24).

In the case that the number of pages at present is not a multiple of the maximum number of loading sheets of the stacker of the discharge destination (step s24, No), whether it is the final page of the job is determined (step s25).

In the case that it is not the final page of the job (step s25, No), the front-and-back adjustment mark is printed on the paper sheet (step s28) and the generation of the image data for final printing is completed.

In the case that it is the final page of the job (step s25, Yes), whether it is face-up and the front surface or it is face-down and the back surface is determined (step s26).

On the other hand, in the case that the number of pages at present is a multiple of the maximum number of loading sheets of the stacker of the discharge destination (step s24, Yes), whether it is face-up and the front surface or it is face-down and the back surface is determined (step s26).

In the case that the conditions in step s26 are not satisfied (step s26, No), the front-and-back adjustment mark is printed on the paper sheet (step s28), and the generation of the image data for final printing is completed.

In the case that the conditions in step s26 are satisfied (step s26, Yes), the front-and-back adjustment mark is not printed on the paper sheet (step s27), and the generation of the image data for final printing is completed.

Note that, while the paper discharge to the stacker is described above, the similar processing can be performed also in the case of discharging the paper sheets to the plurality of paper discharge trays.

In a job of printing one thousand sheets or two thousand sheets, since the stackers alternately output the paper sheets, it is insufficient when the front-and-back adjustment is not performed only on the final page.

Figure 9:
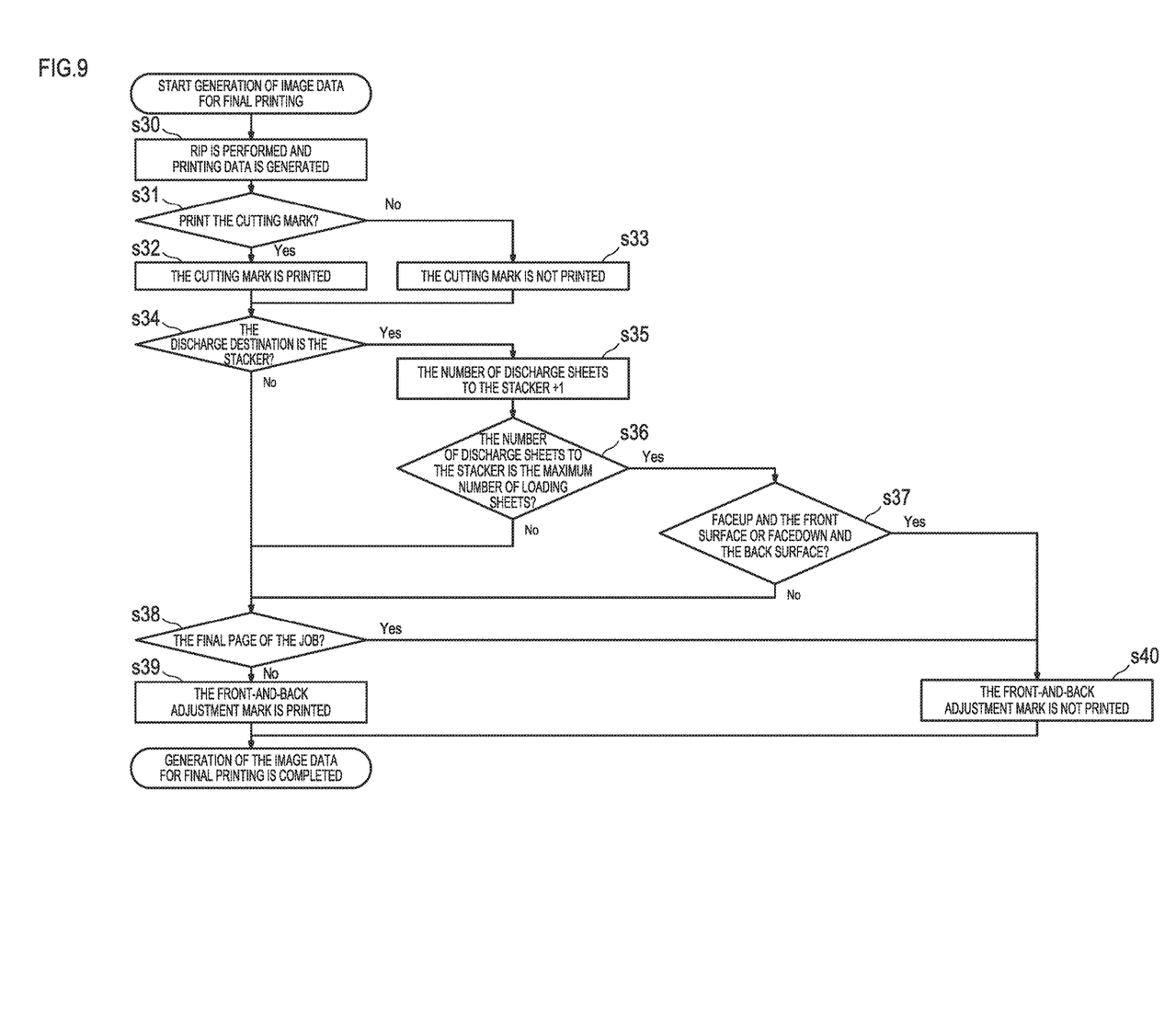
FIG. 9 is a flowchart illustrating a procedure of processing printing of a front-and-back adjustment mark upon discharge to a stacker, in a yet another embodiment of the present invention.

In this example, a procedure of performing the control of not printing the front-and-back adjustment mark since the possibility of being the first page for cutting is high in the case that the number of which an amount of the stacker and the number of sheets outputted by the present job are added reaches the number of loading sheets to the stacker, by counting the number of sheets discharged to the stacker (it is the same for the paper discharge tray), will be described based on a flowchart in FIG. 9. Note that the following procedure is executed by the control of the control unit.

Accompanying the generation start of the image data for final printing, the RIP (Raster Image Process) is performed and the printing data is generated (step s30). Then, whether to print the cutting mark is determined (step s31). Whether to print the cutting mark is determined by setting beforehand. In addition, whether to print the cutting mark can be inquired through the operation panel as the job is started. In the case of printing the cutting mark (step s31, Yes), the cutting mark is printed on the paper sheet (step s32). In the case of not printing the cutting mark (step s31, No), the cutting mark is not printed (step s33).

After step s32 or step s33, whether the discharge destination is the stacker is determined (step s34). The discharge destination is determined by the control unit beforehand.

In the case that the discharge destination is not the stacker (step s34, No), whether it is the final page of the job is determined (step s38).

In the case that the discharge destination is the stacker (step s34, Yes), 1 is added to the number of discharge sheets to the stacker (step s35). Then, whether the number of discharge sheets to the stacker is the maximum number of loading sheets is determined (step s36). The maximum number of loading sheets of the stacker is recognized in the control unit.

In the case that the number of discharge sheets to the stacker is not the maximum number of loading sheets (step s36, No), whether it is the final page of the job is determined (step s38).

In the case that the number of discharge sheets to the stacker is the maximum number of loading sheets (step s36, Yes), whether it is face-up and the front surface or it is face-down and the back surface is determined (step s37).

In the case that the conditions in step s37 are not satisfied (step s37, No), whether it is the final page of the job is determined (step s38). In the case that the conditions in step s37 are satisfied (step s37, Yes), the front-and-back adjustment mark is not printed on the paper sheet (step s40), and the generation of the image data for final printing is completed.

In the case that it is not the final page (step s38, No) in the determination of the final page of the job (step s38), the front-and-back adjustment mark is printed on the paper sheet (step s39), and the generation of the image data for final printing is completed.

In the case that it is the final page (step s38, Yes) in the determination of the final page of the job (step s38), the front-and-back adjustment mark is not printed (step s40), and the generation of the image data for final printing is completed.

According to the present embodiment, there is an effect of preventing operation errors or the like due to the first additional image printed on the top surface of the printed bundle when printing the first additional image.

The present invention is described above based on the above-described embodiments, however, the present invention is not limited to the description of the above-described embodiments, and the above-described embodiments can be appropriately modified without deviating from the scope of the present invention.

Although the present invention has been described and illustrated in detail, it is clearly understood that the same is by way of illustrated and example only and is not to be taken by way limitation, the scope of the present invention being interpreted by terms of the appended claims.

What is claimed is:

1. An image forming apparatus comprising:
   an image forming unit that prints an image on a recording medium based on image data;
   a conveyance unit that conveys the recording medium; and
   a control unit that controls the image forming unit and the conveyance unit,
   wherein the control unit has a function of printing a first additional image outside an image forming area of the recording medium by the image forming unit,
   wherein, when printing the first additional image, the control unit is configured for control of inhibiting printing of the first additional image on one or both of a leading recording medium and a final recording medium in a bundle of piled up recording media,
   wherein the control unit has a function of forming a cutting mark as a second additional image outside the image forming area on the recording medium by the image forming unit, and
   wherein the control unit does not perform control of inhibiting printing of the first additional image when not printing the second additional image.

2. The image forming apparatus according to claim 1, comprising:
   a duplex printing mechanism that is included in the conveyance unit, inverts and conveys the recording medium on one surface of which an image is formed, and conveys the recording medium to a conveyance direction upstream side of the image forming unit,
   wherein the control unit has a front-and-back adjustment function of printing a front-and-back adjustment mark outside the image forming area of the recording medium by the image forming unit as the first additional image, acquiring an image read result of the front-and-back adjustment mark, and performing front-and-back adjustment in the image formation using the image read result upon duplex printing, and
   wherein, when printing the front-and-back adjustment mark on the recording medium by the front-and-back adjustment function, the control unit is configured for control of inhibiting printing of the front-and-back adjustment mark on one or both of a leading recording medium and a final recording medium in the bundle of piled up recording media.

3. The image forming apparatus according to claim 1, comprising:
   a read unit that detects the front-and-back adjustment mark,
   wherein the control unit acquires an image read result by the read unit.

4. The image forming apparatus according to claim 1, wherein the outside of the image forming area is a cutting margin.

5. The image forming apparatus according to claim 1, wherein the bundle is a bundle of the recording media output as a copy.

6. The image forming apparatus according to claim 1, wherein the bundle is a bundle of the recording media loaded on a paper discharge tray.

7. The image forming apparatus according to claim 1, wherein the bundle is a bundle of the recording media when loaded on a paper discharge tray within a maximum number of sheets.

8. The image forming apparatus according to claim 7, wherein the control unit is configured for control of switching a paper discharge destination, and performs control to inhibit printing of the first additional image on the recording medium which is one or both of a leading recording medium and a final recording medium, to the bundle outputted to the paper discharge tray of a switching destination when the paper discharge destination is switched.

9. An image forming system comprising:
   an image forming unit that prints an image on a recording medium based on a job;
   a conveyance unit that conveys the recording medium; and
   a control unit that controls the image forming unit and the conveyance unit,
   wherein the control unit has a function of printing a first additional image outside an image forming area of the recording medium by the image forming unit,
   wherein, when printing the first additional image, the control unit is configured for control of inhibiting printing of the first additional image on one or both of a leading recording medium and a final recording medium in a bundle of piled up recording media,
   wherein the control unit has a function of forming a cutting mark as a second additional image outside the image forming area on the recording medium by the image forming unit, and
   wherein the control unit does not perform control of inhibiting printing of the first additional image when not printing the second additional image.

10. The image forming system according to claim 9, comprising:
    a duplex printing mechanism that is included in the conveyance unit, inverts and conveys the recording medium on one surface of which an image is formed, and conveys the recording medium to a conveyance direction upstream side of the image forming unit; and
    a read unit that reads the image on the recording medium,
    wherein the control unit has a front-and-back adjustment function of printing a front-and-back adjustment mark outside the image forming area of the recording medium by the image forming unit as the first additional image, acquiring an image read result of the front-and-back adjustment mark from the read unit, and performing front-and-back adjustment in the image formation using the image read result upon duplex printing, and
    wherein, in a job of printing the front-and-back adjustment mark on the recording medium, the control unit performs control of inhibiting printing of the front-and-back adjustment mark on the recording medium which is one or both of a leading medium and a final medium in a bundle of piled up recording media.

11. An image forming method comprising:

an image forming step of executing printing of an image to a recording medium based on a job; and an additional image printing step of printing a first additional image outside an image forming area of the recording medium, wherein, in the additional image printing step, a job of printing the first additional image to the recording medium is inhibited from printing the first additional image to the recording medium which is one or both of a leading medium and a final medium in a bundle of piled up recording media, wherein a cutting mark is formed as a second additional image outside the image forming area on the recording medium, and wherein control of inhibiting printing of the first additional image is not performed when not printing the second additional image.

12. The image forming method according to claim 11, comprising:

a front-and-back adjustment step of turning the first additional image in the additional image printing step to a front-and-back adjustment mark and controlling front-and-back adjustment in the image formation upon duplex printing to the recording medium, based on an image read result of the front-and-back adjustment mark, wherein, in the additional image printing step, control is performed to inhibit printing of the front-and-back adjustment mark to the recording medium which is one or both of a leading medium and a final medium in a bundle of piled up recording media, to the job of printing the front-and-back adjustment mark to the recording medium.

13. An image forming method comprising:

an image forming step of making printing of an image to a recording medium be executed based on a job; and an additional image printing step of making a first additional image be printed outside an image forming area of the recording medium, wherein, in the additional image printing step, a job of printing the first additional image to the recording medium is inhibited from printing the first additional image to the recording medium which is one or both of a leading medium and a final medium in a bundle of piled up recording media, wherein a cutting mark is formed as a second additional image outside the image forming area on the recording medium, and wherein control of inhibiting printing of the first additional image is not performed when not printing the second additional image.

* * * * *